(12) United States Patent
Kumar et al.

(10) Patent No.: US 11,506,059 B2
(45) Date of Patent: Nov. 22, 2022

(54) COMPRESSOR IMPELLER WITH PARTIALLY SWEPT LEADING EDGE SURFACE

(71) Applicant: HONEYWELL INTERNATIONAL INC., Charlotte, NC (US)

(72) Inventors: Shailesh Kumar, Bangalore (IN); Shakeel Nasir, Phoenix, AZ (US); Jyotichandra Jingade, Bangalore (IN); Mahmoud Mansour, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 121 days.

(21) Appl. No.: 17/030,040

(22) Filed: Sep. 23, 2020

(65) Prior Publication Data
US 2022/0042415 A1 Feb. 10, 2022

(30) Foreign Application Priority Data
Aug. 7, 2020 (IN) .............................. 202011033883

(51) Int. Cl.
| | | |
|---|---|---|
| *F01D 5/14* | (2006.01) | |
| *F02C 3/08* | (2006.01) | |
| *F01D 5/04* | (2006.01) | |

(52) U.S. Cl.
CPC ................ *F01D 5/141* (2013.01); *F02C 3/08* (2013.01); *F05D 2220/323* (2013.01);
(Continued)

(58) Field of Classification Search
CPC . F01D 5/141; F01D 5/12; F01D 9/045; F02C 3/08; F04D 29/284; F04D 29/544;
(Continued)

(56) References Cited

U.S. PATENT DOCUMENTS 6,190,132 B1 2/2001 Yamakawa et al.
8,277,187 B2 * 10/2012 Schluter ................ F04D 29/284
416/185

(Continued)

FOREIGN PATENT DOCUMENTS

| | | |
|---|---|---|
| CN | 107869482 B | 3/2019 |
| CN | 107725477 B | 5/2019 |

(Continued)

OTHER PUBLICATIONS

Machine Translation of FR3089576 [retrieved on Mar. 21, 2022]. Retrieved from: Espacenet. (Year: 2022).*

*Primary Examiner* — Eric J Zamora Alvarez
(74) *Attorney, Agent, or Firm* — Lorenz & Kopf, LLP (57) ABSTRACT

An impeller associated with a compressor of a gas turbine engine includes a plurality of impeller blades. Each impeller blade of the plurality of impeller blades has a leading edge and a trailing edge opposite the leading edge in a streamwise direction. Each impeller blade of the plurality of impeller blades extends in a spanwise direction from a hub at 0% span to a tip at 100% span, and each impeller blade of the plurality of impeller blades has a plurality of mean camber lines that each extend from the leading edge to the trailing edge at a respective spanwise location. The leading edge includes a partially swept leading edge surface defined between 70% span to 100% span that extends in the streamwise direction between 3% to 15% of a mean camber line at 100% span.

15 Claims, 5 Drawing Sheets

(52) U.S. Cl.
CPC .. *F05D 2240/303* (2013.01); *F05D 2240/304* (2013.01); *F05D 2240/305* (2013.01); *F05D 2240/306* (2013.01); *F05D 2250/14* (2013.01)

(58) Field of Classification Search
CPC ........... F05D 2220/323; F05D 2220/32; F05D 2240/303; F05D 2240/12; F05D 2240/121; F05D 2240/304; F05D 2240/305; F05D 2240/306; F05D 2240/307; F05D 2250/14; F05D 2250/70
See application file for complete search history.

(56) References Cited

U.S. PATENT DOCUMENTS

| | | | |
|---|---|---|---|
| 9,771,803 | B2 | 9/2017 | Cornelius et al. |
| 2018/0135525 | A1* | 5/2018 | Morgan .................... F02C 9/18 |
| 2018/0266442 | A1 | 9/2018 | Iwakiri et al. |

FOREIGN PATENT DOCUMENTS

| | | |
|---|---|---|
| DE | 102012004388 A1 | 9/2013 |
| EP | 1972795 A2 | 9/2008 |
| FR | 3089576 A1 | 6/2020 |

* cited by examiner

COMPRESSOR IMPELLER WITH PARTIALLY SWEPT LEADING EDGE SURFACE

CROSS REFERENCE TO RELATED APPLICATION

This application claims priority to Indian Provisional Patent Application No. 202011033883, filed Aug. 7, 2020, the entire content of which is incorporated by reference herein.

TECHNICAL FIELD

The present disclosure generally relates to gas turbine engines, and more particularly relates to a compressor, such as a radial compressor, having an impeller with a partially swept leading edge surface.

BACKGROUND

Gas turbine engines may be employed to power various devices. For example, a gas turbine engine may be employed to power a mobile platform, such as an aircraft. Generally, gas turbine engines include one or more compressors, which operate to draw air into the gas turbine engine and to raise a pressure of that air. Each of the compressors has one or more airfoils or blades that are rotatable to accomplish this task. In the example of a radial compressor, the radial compressor attains a pressure rise by adding kinetic energy to the air by an impeller, and the kinetic energy is converted to a static pressure rise by a diffuser. The performance of the radial compressor is based on an efficiency of the impeller. Generally, a leading edge of the impeller experiences axial entry of a high flow velocity fluid, which may lead to flow separation along the impeller. The flow separation may result in pressure loses, which may impact the efficiency of the radial compressor.

Accordingly, it is desirable to provide an impeller with a partially swept leading edge surface that increases an efficiency of the radial compressor by reducing flow separation and pressure losses, thereby improving performance of the gas turbine engine. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an impeller associated with a compressor of a gas turbine engine. The impeller includes a plurality of impeller blades. Each impeller blade of the plurality of impeller blades has a leading edge and a trailing edge opposite the leading edge in a streamwise direction. Each impeller blade of the plurality of impeller blades extends in a spanwise direction from a hub at 0% span to a tip at 100% span, and each impeller blade of the plurality of impeller blades has a plurality of mean camber lines that each extend from the leading edge to the trailing edge at a respective spanwise location. The leading edge includes a partially swept leading edge surface defined between 70% span to 100% span that extends in the streamwise direction between 3% to 15% of a mean camber line at 100% span.

The impeller includes a plurality of splitter blades and a hub, the plurality of impeller blades coupled to the hub such that a respective one of the plurality of splitter blades is positioned between adjacent ones of the plurality of impeller blades so as to be downstream from the leading edge of the adjacent ones of the plurality of impeller blades. A blade height of each impeller blade of the plurality of impeller blades is reduced in the spanwise direction along the partially swept leading edge surface compared to a remainder of the impeller blade downstream from the partially swept leading edge surface. The blade height increases monotonically in the spanwise direction and the streamwise direction along the partially swept leading edge surface from 70% span at the leading edge to the tip. Each impeller blade of the plurality of impeller blades has a first blade height in the spanwise direction at the leading edge that is different than a second blade height and a third blade height each downstream of the leading edge. At 80% of the span downstream of the leading edge, the partially swept leading edge surface is defined at between 1% to 7% of a mean camber line at 80% span. At 90% of the span downstream of the leading edge, the partially swept leading edge surface is defined at between 7% to 12.5% of a mean camber line at 90% span. At 100% of the span downstream of the leading edge, the partially swept leading edge surface is defined at between 12.5% to 15% of the mean camber line at 100% span. Each impeller blade of the plurality of impeller blades has a pressure side opposite a suction side, and the partially swept leading edge surface is defined uniformly through both the pressure side and the suction side. The partially swept leading edge surface has an elliptical profile.

Also provided is a radial compressor of a gas turbine engine. The radial compressor includes an impeller having a plurality of impeller blades and a plurality of splitter blades each coupled to an impeller hub. Each impeller blade of the plurality of impeller blades has a leading edge and a trailing edge opposite the leading edge in a streamwise direction. Each impeller blade of the plurality of impeller blades extends in a spanwise direction from a hub at 0% span to a tip at 100% span, with the leading edge including a partially swept leading edge surface defined at 70% span at the leading edge that extends to the tip downstream of the leading edge. Each splitter blade of the plurality of splitter blades is positioned between an adjacent pair of the plurality of impeller blades downstream from the leading edge. The radial compressor includes a diffuser downstream of the impeller.

Each impeller blade of the plurality of impeller blades has a plurality of mean camber lines that each extend from the leading edge to the trailing edge at a respective spanwise location, and the partially swept leading edge surface extends in the streamwise direction between 3% to 15% of a mean camber line at 100% span. At 80% of the span, the partially swept leading edge surface is defined at between 1% to 7% of a mean camber line at 80% span. At 90% of the span, the partially swept leading edge surface is defined at between 7% to 12.5% of a mean camber line at 90% span. At 100% of the span downstream of the leading edge, the partially swept leading edge surface is defined at between 12.5% to 15% of the mean camber line at 100% span. The partially swept leading edge surface has an elliptical profile. A blade height of each impeller blade of the plurality of impeller blades is reduced in the spanwise direction along the partially swept leading edge surface compared to a remainder of the impeller blade downstream from the partially swept leading edge surface. The blade height increases monotonically in the spanwise direction and the streamwise direction along the partially swept leading edge surface from 70% span at the leading edge to the tip. Each impeller blade of the plurality of impeller blades has a first blade height in the spanwise direction at the leading edge that is different than a second blade height and a third blade height each downstream of the leading edge. Each impeller blade of the plurality of impeller blades has a pressure side opposite a suction side, and the partially swept leading edge surface is defined uniformly through both the pressure side and the suction side.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of compressor that would benefit from having a partially swept leading edge, and the impeller of a radial compressor described herein for a gas turbine engine is merely one exemplary embodiment according to the present disclosure. In addition, while the radial compressor is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel. It should be noted that the numerical values provided herein do not account for manufacturing tolerances, and the values stated in the claims are considered to include a finished product that may be within positive 10% to negative 10% of the values stated herein.

Figure 1:
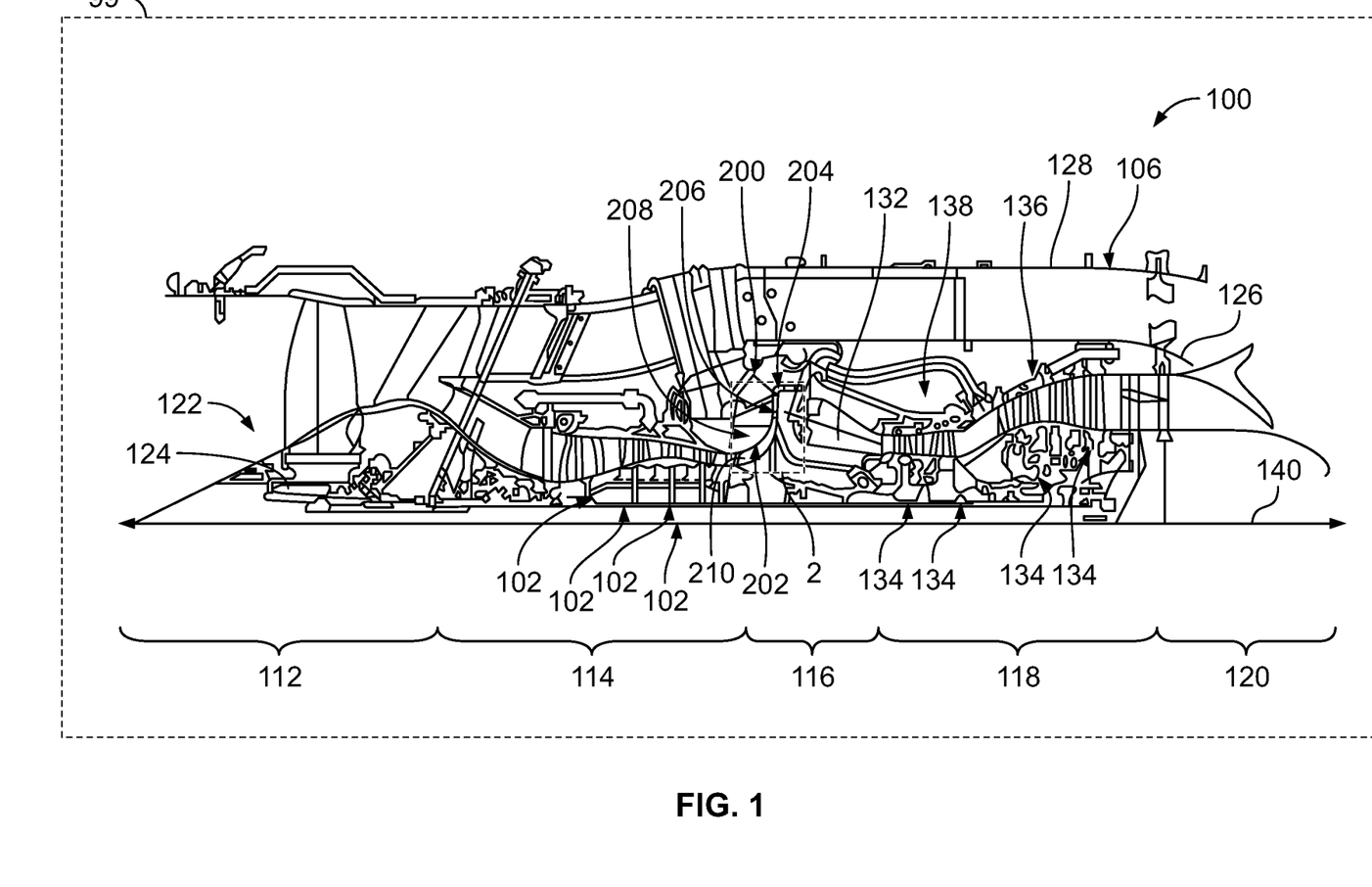
FIG. 1 is a schematic cross-sectional illustration of a gas turbine engine, which includes an exemplary radial compressor having an impeller including a plurality of impeller blades with a partially swept leading edge surface in accordance with the various teachings of the present disclosure.
Figure 3:
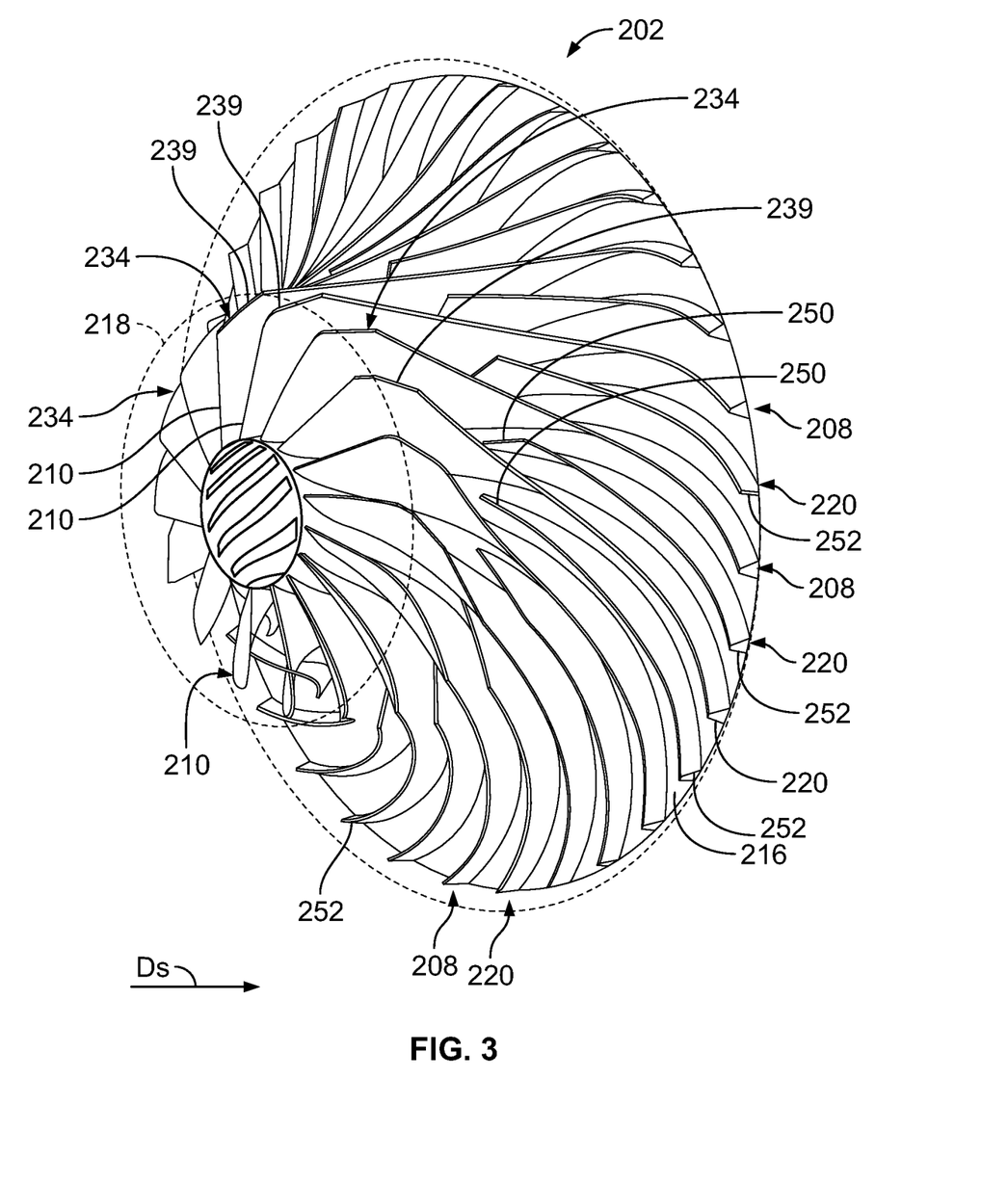
FIG. 3 is a perspective view of the impeller, which includes the plurality of impeller blades with the partially swept leading edge surface and a plurality of splitter blades.

With reference to FIG. 1, a partial, cross-sectional view of an exemplary gas turbine engine 100 is shown with the remaining portion of the gas turbine engine 100 being substantially axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. For example, in other embodiments, the gas turbine engine 100 may assume the form of a non-propulsive engine, such as an Auxiliary Power Unit (APU) deployed onboard the aircraft 99, or an industrial power generator. As will be discussed herein, the gas turbine engine 100 includes a radial compressor 200, which obtains a pressure rise in a working fluid, such as air, which exits one or more axial compressors 102. Generally, the radial compressor 200 includes an impeller 202 and a diffuser 204. The impeller 202 is generally spaced apart from the diffuser 204 by a vaneless gap 206 that is devoid of vanes or airfoils. In this example, the impeller 202 has a plurality of impeller blades 208 with a leading edge 210 that is partially swept. As will be discussed, the leading edge 210 of each of the impeller blades 208 improves an efficiency of the radial compressor 200 by reducing pressure losses due to reduced tip leakage vortex generating from modified loading near a tip of the leading edge 210 of the impeller blades 208, reducing flow separation due to improved streamlined flow and reducing flow blockage upstream of a plurality of splitter blades 220 (FIG. 3) associated with the impeller 202, which improves a performance of the gas turbine engine 100. Generally, due to the leading edge 210 being partially swept, the impeller blades 208 delay shock wave formation near the leading edge 210, which results in reduced flow separation, reduced pressure losses due to the modified loading near the tip of the leading edge 210 and reduced flow blockage upstream of the splitter blades 220 (FIG. 3). In addition, the leading edge 210 being partially swept increases an inducer area of the impeller 202, which increases choke mass flow capacity. The leading edge 210 of each of the impeller blades 208 also improves the high cycle fatigue vibratory characteristics of the impeller blades 208 due to a reduced mass of the leading edge 210 in the swept back region, in which the high cycle fatigue vibratory characteristics are defined by the square root of (K/m), wherein K is the stiffness of the impeller blade 208 and m is the mass of the impeller blade 208. The partially swept leading edge 210 also improves the hub stresses in the region of the leading edge 210, which is beneficial for the highly lean impeller blades 208. In one example, the impeller 202 with the impeller blades 208 improves the efficiency of the radial compressor 200 by about 0.50%, and improves choke mass flow capacity by about 2%. The impeller 202 with the impeller blades 208 also improves the overall pressure ratio by about 0.10%, and the numerical stall margin of the radial compressor 200 is also improved by about 7% due to the flow characteristics associated with the partially swept leading edge 210 discussed above. It should be noted that while the leading edge 210 that is partially swept is described herein as being used with the impeller 202 associated with the radial compressor 200, the leading edge 210 that is partially swept may be employed with impeller blades associated with a mixed-flow impeller.

In this example, with continued reference to FIG. 1, the gas turbine engine 100 includes a fan section 112, a compressor section 114, a combustor section 116, a turbine section 118, and an exhaust section 120. In one example, the fan section 112 includes a fan 122 mounted on a rotor 124 that draws air into the gas turbine engine 100 and compresses it. A fraction of the compressed air exhausted from the fan 122 is directed through the outer bypass duct 106 and the remaining fraction of air exhausted from the fan 122 is directed into the compressor section 114. The outer bypass duct 106 is generally defined by an outer casing 128 that is spaced apart from and surrounds the exhaust guide vane 126.

In the embodiment of FIG. 1, the compressor section 114 includes the one or more axial compressors 102 and the radial compressor 200. The number of compressors in the compressor section 114 and the configuration thereof may vary. The one or more axial compressors 102 and the radial compressor 200 sequentially raise the pressure of the air and direct a majority of the high pressure air into the combustor section 116. A fraction of the compressed air bypasses the combustor section 116 and is used to cool, among other components, turbine blades in the turbine section 118.

In the embodiment of FIG. 1, in the combustor section 116, which includes a combustion chamber 132, the high pressure air is mixed with fuel, which is combusted. The high-temperature combustion air or combustive gas flow is directed into the turbine section 118. In this example, the turbine section 118 includes one or more turbines 134 disposed in axial flow series. It will be appreciated that the number of turbines, and/or the configurations thereof, may vary. The combustive gas expands through and rotates the turbines 134. The combustive gas flow then exits turbine section 118 for mixture with the cooler bypass airflow from the outer bypass duct 106 and is ultimately discharged from gas turbine engine 100 through exhaust section 120. As the turbines 134 rotate, each drives equipment in the gas turbine engine 100 via concentrically disposed shafts or spools. Generally, the turbines 134 in the turbine section 118, the axial compressors 102 and the radial compressor 200 in the compressor section 114 and the fan 122 are mechanically linked by one or more shafts or spools. For example, in a two spool turbofan engine platform, the turbine rotors contained within a high pressure (HP) turbine stage 136 may be rotationally fixed to the axial compressors 102 and the radial compressor 200 contained within compressor section 114 by a HP shaft, while the turbines 134 contained within a low pressure (LP) turbine stage 138 may be rotationally fixed to the rotor 124 of the fan 122 by a coaxial LP shaft. In other embodiments, gas turbine engine 100 may be a single spool engine or a multi-spool engine containing more than two coaxial shafts.

Figure 2:
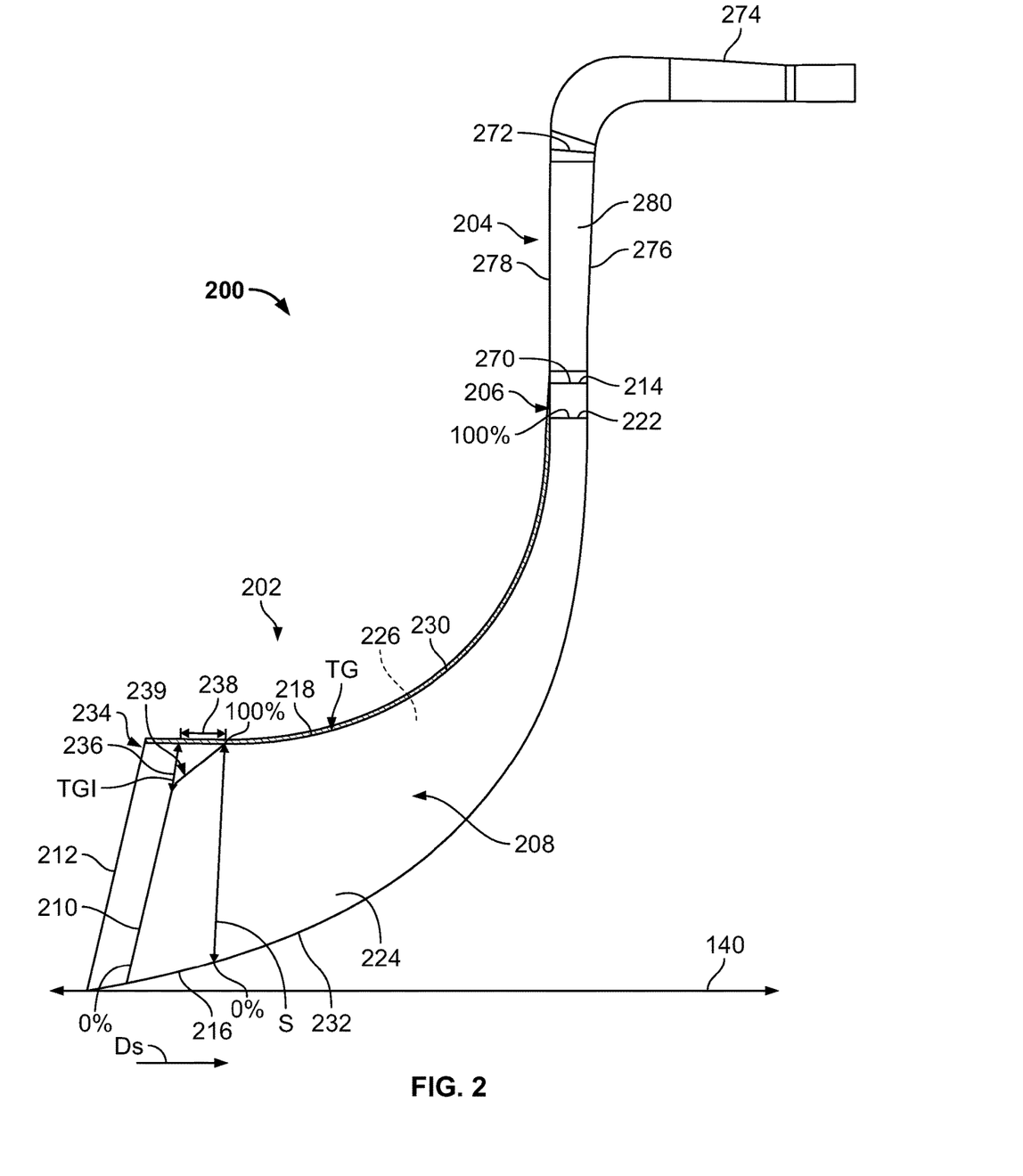
FIG. 2 is a detail cross-sectional view, taken at 2 on FIG. 1, of the radial compressor, which illustrates the impeller including the plurality of impeller blades with the partially swept leading edge surface and a diffuser of the radial compressor in accordance with the various teachings of the present disclosure.

With reference to FIG. 2, a detail cross-sectional view of the radial compressor 200 is shown. In this example, the radial compressor 200 is downstream from one or more axial compressors 102 (FIG. 1) to receive the compressed air. The radial compressor 200 includes the impeller 202 upstream from the diffuser 204. The impeller 202 has an impeller inlet 212 in fluid communication with the one or more axial compressors 102 (FIG. 1) and an impeller outlet 214 in fluid communication with the diffuser 204. The impeller 202 includes an impeller hub 216, an impeller shroud 218, the plurality of impeller blades 208 and the plurality of splitter blades 220 (FIG. 3). It should be noted that while the impeller 202 is described herein as including the impeller blades 208 and the splitter blades 220, the impeller 202 may just include the impeller blades 208, if desired.

The impeller hub 216 is spaced apart from the impeller shroud 218. The impeller hub 216 is substantially annular, and is axisymmetric about the longitudinal axis 140. The impeller hub 216 is coupled to a shaft, such as the HP shaft discussed with regard to FIG. 1. The impeller hub 216 rotates with the shaft, while the impeller shroud 218 is stationary. The impeller hub 216 is composed of a metal or metal alloy, and may be formed by casting, additive manufacturing (direct metal laser sintering (DMLS), etc.), etc. The impeller hub 216 is axially and radially spaced apart from the impeller shroud 218.

The impeller shroud 218 is positioned opposite the impeller hub 216. The impeller shroud 218 is substantially annular, and is axisymmetric about the longitudinal axis 140. The impeller shroud 218 is composed of a metal or metal alloy, and may be formed by casting, additive manufacturing (DMLS, etc.), etc. The impeller shroud 218 is spaced apart from the impeller blades 208 downstream of a partially swept region 234 of the impeller blade 208 to maintain a tip gap TG between the impeller shroud 218 and the impeller blades 208 downstream of a partially swept region 234. The impeller shroud 218 may be coupled to a supporting structure associated with the gas turbine engine 100, for example, to maintain the spacing of the impeller shroud 218 from the impeller blades 208.

The impeller blades 208 add kinetic energy to the compressed air received through the impeller inlet 212. The impeller blades 208 are each composed of a metal or metal alloy, and may be formed by casting, additive manufacturing (DMLS, etc.), etc. The impeller blades 208 are generally integrally formed with the impeller hub 216; however, the impeller blades 208 may be discretely formed and coupled to the impeller hub 216. Generally, with reference to FIG. 3, the impeller 202 has the plurality of the impeller blades 208, which are spaced apart in an annular array about a circumference of the impeller hub 216. With reference back to FIG. 2, each of the impeller blades 208 includes the leading edge 210 and an opposite, downstream trailing edge 222. The leading edge 210 is in fluid communication with the impeller inlet 212, and the trailing edge 222 terminates at the vaneless gap 206. In this example, the trailing edge 222 extends along an axis, which is substantially parallel to the longitudinal axis 140 of the gas turbine engine 100.

Each of the impeller blades 208 has a pressure side 224 and an opposed suction side 226. The pressure side 224 and the suction side 226 extend from the leading edge 210 to the trailing edge 222 and from the root 232 to the tip 230. The tip 230 is proximate the impeller shroud 218, and the root 232 is coupled to the impeller hub 216. Each of the impeller blades 208 has a span S, which is 0% at the root 232 and 100% at the tip 230. Thus, each of the impeller blades 208 generally extend in a spanwise direction from the root 232 (at 0% span) to the tip 230 (at 100% span). Each of the impeller blades 208 also has a blade height in the spanwise direction.

In addition, the pressure side 224 and the suction side 226 are opposed in a thickness direction normal to a respective mean camber line 228 (FIG. 4) that extends from the leading edge 210 to the trailing edge 222 for a particular location along the span S (0% to 100% span) or spanwise location. The mean camber line 228 of each of the impeller blades 208 at a particular spanwise location is a line joining the leading edge 210 and the trailing edge 222, which is equidistant from the pressure side 224 to the suction side 226. Thus, along the span S of the impeller blade 208 from 0% at the root 232 to 100% at the tip 230, each spanwise location has a respective mean camber line 228, which connects the leading edge 210 and the trailing edge 222 and is equidistant from the pressure side 224 and the suction side 226. Generally, the mean camber line 228 is 0% at the leading edge 210, and is 100% at the trailing edge 222. Stated another way, for a particular location along the span or spanwise location of the respective impeller blade 208, the mean camber line 228 extends in a streamwise direction Ds from 0% span at the leading edge 210 to 100% span at the trailing edge 222, equidistant between the pressure side 224 and the suction side 226. Generally, the streamwise direction Ds is a direction of fluid flow through the impeller 202, which is from the leading edge 210 to the trailing edge 222 of the impeller 202. In one example, each of the impeller blades 208 is somewhat asymmetrical and cambered along the respective mean camber line 228. The pressure side 224 has a contoured, generally convex surface geometry, which gently bends or curves in three dimensions. The suction side 226 has a contoured, generally concave surface geometry, which likewise bends or curves in three dimensions. In other embodiments, the impeller blades 208 may not be cambered and may be either symmetrical or asymmetrical.

The leading edge 210 of each of the impeller blades 208 is partially swept and includes the partially swept region 234 that defines a partially swept leading edge surface 239. In this regard, with additional reference to FIG. 3, the leading edge 210 of each of the impeller blades 208 has the partially swept region 234, which is defined proximate the impeller shroud 218 and extends from the leading edge 210 toward the trailing edge 222 (FIG. 3) in the streamwise direction Ds. As the partially swept region 234 for each of the impeller blades 208 is the same, for ease of description, the partially swept region 234 for one of the impeller blades 208 will be discussed herein. With reference back to FIG. 2, the partially swept region 234 is defined at the leading edge 210 and extends toward the trailing edge 222. In one example, the partially swept region 234 is defined at about 70% at the leading edge 210, and increases monotonically to 100% span from the leading edge 210 to the trailing edge 222. Generally, the partially swept region 234 extends from 0% to about 3% to about 15% of the respective mean camber line 228 in the streamwise direction Ds or from about 3% to about 15% of the tip 230 of the impeller blade 208. Thus, the partially swept region 234 includes a spanwise height 236 and a streamwise width 238. The spanwise height 236 and the streamwise width 238 cooperate to define an area of the impeller blade 208 from the leading edge 210 toward the trailing edge 222 that is removed to define the partially swept region 234. Stated another way, the partially swept region 234 is a region of the impeller blade 208 along the leading edge 210 that is removed or cut along a partially swept leading edge surface 239, which increases a tip gap TG1 at the leading edge 210 between the impeller blade 208 and the impeller shroud 218 along the partially swept region 234 when compared to a remainder of the impeller blade 208. The partially swept region 234 is defined uniformly through the impeller blade 208 such that the removed or cut portion of the impeller blade 208 that defines the partially swept leading edge surface 239 is defined through both the pressure side 224 and the suction side 226. Thus, the partially swept leading edge surface 239 results in the impeller blade 208 having a reduced blade height in the streamwise direction Ds from the leading edge 210 toward the trailing edge 222.

Figure 4:
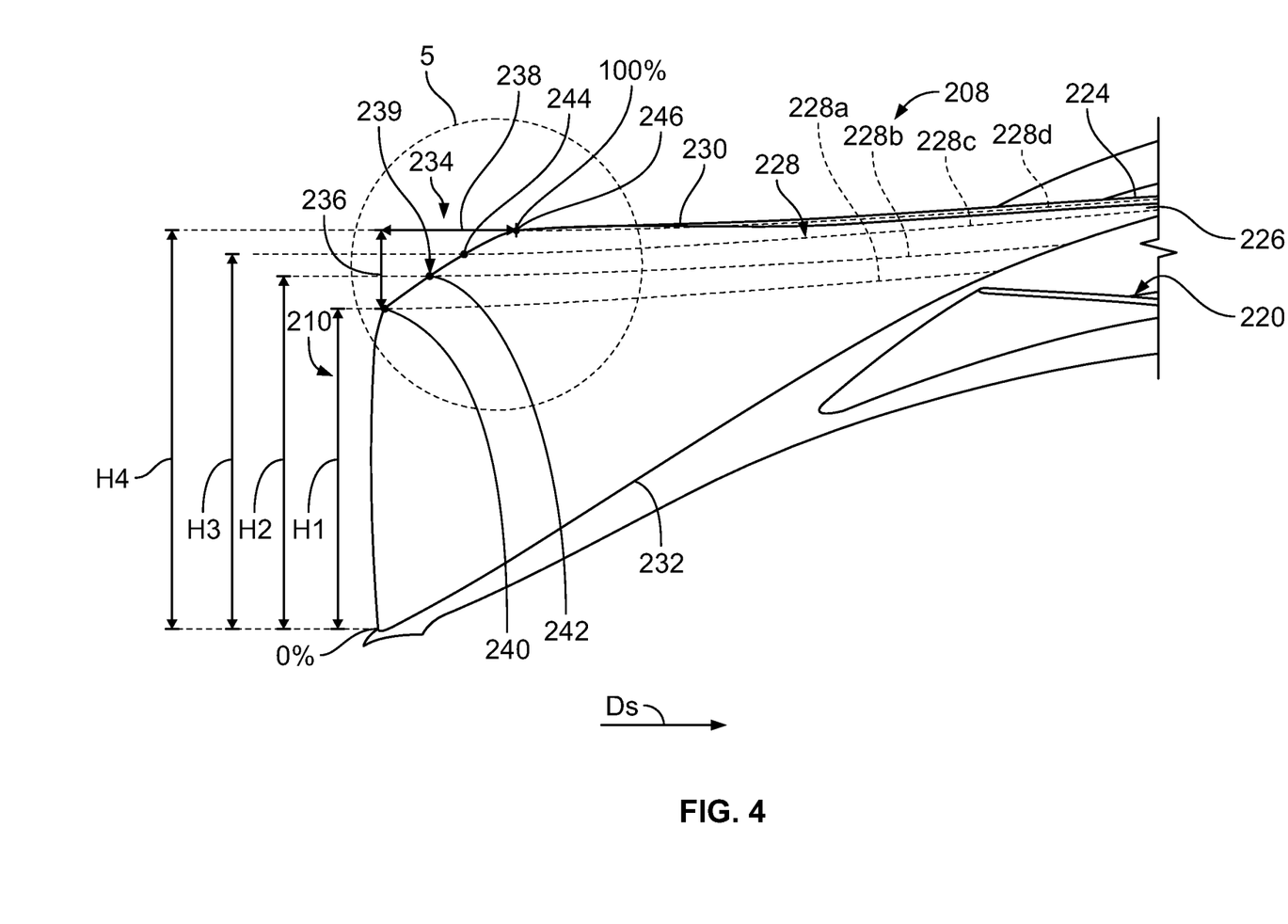
FIG. 4 is a side view of a portion of one of the impeller blades with the partially swept leading edge surface and a portion of a downstream splitter blade.

With reference to FIG. 4, a detail view of one of the impeller blades 208 is shown. As discussed, the partially swept region 234 is an area of reduced blade height in the streamwise direction Ds and the spanwise direction. In this example, the partially swept region 234 has a decreasing area from the leading edge 210 toward the trailing edge 222 (FIG. 2). At a point 240 at the leading edge 210 on the partially swept leading edge surface 239, the impeller blade 208 has a first blade height H1. In one example, the point 240 is at about 70% span in the spanwise direction, and is at about 0% of a mean camber line 228a at about 70% span in the streamwise direction Ds. At a point 242 on the partially swept leading edge surface 239 axially inward from the leading edge 210, the impeller blade 208 has a second blade height H2. The second blade height H2 is different, and greater than, the first blade height H1. In one example, the point 242 is at about 80% span in the spanwise direction, and is at about 1% to about 7% of a mean camber line 228b at about 80% span in the streamwise direction Ds. At a point 244 on the partially swept leading edge surface 239 axially inward from the leading edge 210, the impeller blade 208 has a third blade height H3. The third blade height H3 is different, and greater than, the first blade height H1 and the second blade height H2. In one example, the point 244 is at about 90% span in the spanwise direction, and is at about 7% to about 12.5% of a mean camber line 228c at about 90% span in the streamwise direction Ds. At a point 246 on the partially swept leading edge surface 239 axially inward from the leading edge 210, the impeller blade 208 has a fourth blade height H4. The fourth blade height H4 is different, and greater than, the first blade height H1, the second blade height H2 and the third blade height H3. In one example, the point 246 is at about 100% span in the spanwise direction, and is at about 12.5% to about 15% of a mean camber line 228d at about 100% span in the streamwise direction Ds.

Thus, in one example, the spanwise height 236 is about 30% of the span, and the streamwise width 238 is about 15% of the mean camber line 228d. The partially swept region 234 results in the impeller blade 208 having the partially swept leading edge surface 239, which has a blade height that varies from about 70% span at the leading edge 210 to 100% span in the spanwise direction and 0% to about 15% of the respective mean camber line 228a-228d in the streamwise direction Ds. In the partially swept region 234, the blade height of the partially swept leading edge surface 239 increases monotonically from about 70% span to 100% span. While a portion of the impeller blade 208 is removed to define the partially swept leading edge surface 239, a thickness of the remaining impeller blade 208 remains unchanged. The partially swept leading edge surface 239 also results in a chord length defined between the leading edge 210 and the trailing edge 222 that decreases from the impeller hub 216 toward the impeller shroud 218, with the chord length defined as a length of a straight line that extends from the leading edge 210 to the trailing edge 222. Generally, an inlet metal angle at a respective streamwise location in the partially swept region 234 remains the same, with the inlet metal angle defined between a reference line that is tangent to the respective mean camber line 228 at the leading edge 210 and a reference line that is parallel to the longitudinal axis 140 of the gas turbine engine 100 (FIG. 1) and normal to a direction of rotation of the impeller 202. The leading edge incidence (relative flow angle—metal angle) changes along the partially swept leading edge surface 239 due to a modified relative flow angle approaching to a now slightly opened leading edge metal angle. In this example, the modified approaching relative flow angle to the now slightly opened leading edge metal angle along the partially swept leading edge surface 239 results in the increase in choke mass flow capacity.

Figures 5A, 5B:
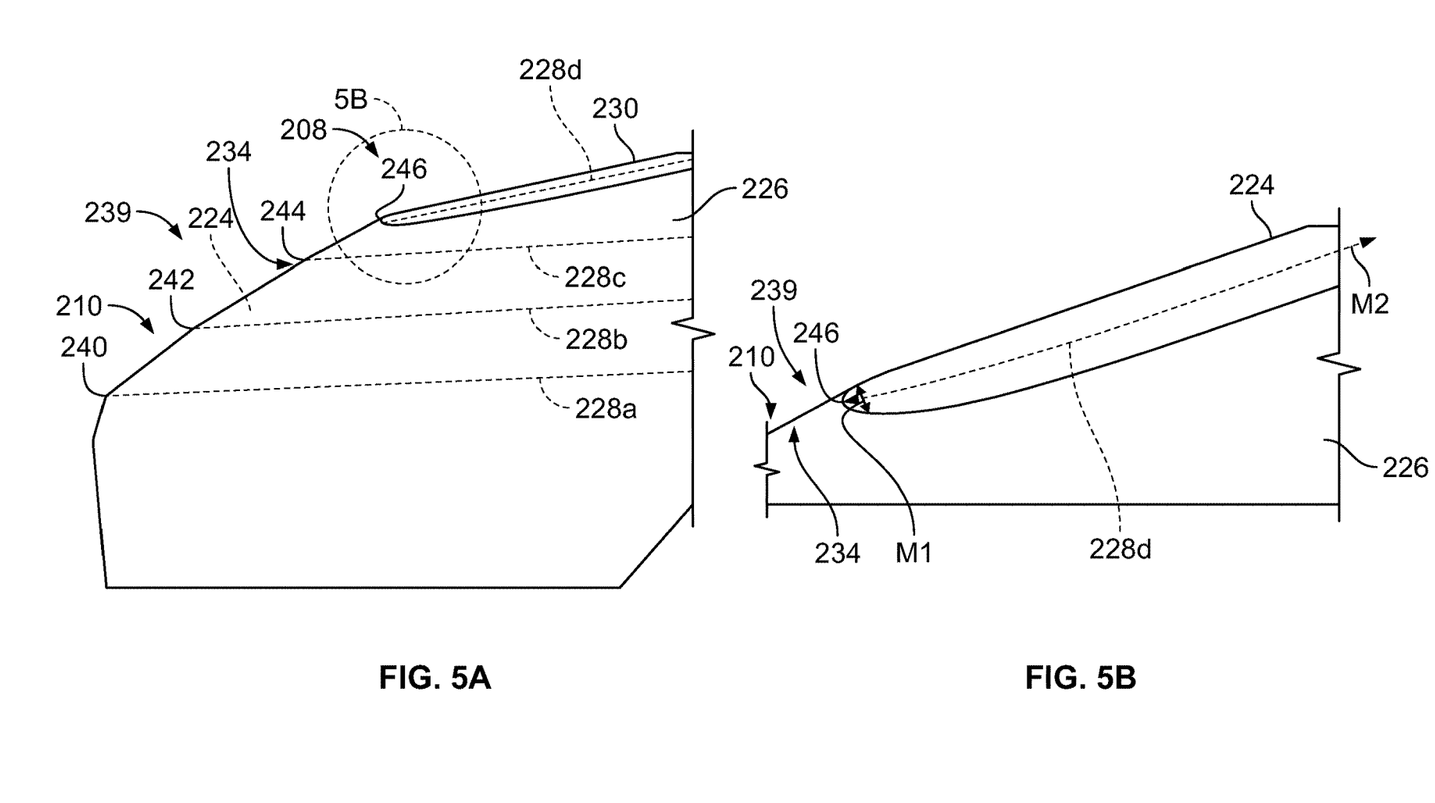
FIG. 5A is a perspective detail view of a portion of a leading edge of one of the impeller blades, which illustrates the partially swept leading edge surface.
FIG. 5B is a perspective detail view of the partially swept leading edge surface of one of the impeller blades.

With reference to FIGS. 5A and 5B, a detail view of the partially swept region 234 is shown. Along the partially swept leading edge surface 239, the impeller blade 208 has a smooth elliptical edge to reduce flow disturbances. In one example, the partially swept leading edge surface 239 has an elliptical ratio of about 1:4. With reference to FIG. 5B, the elliptical ratio is defined by a minor axis M1 that extends between the pressure side 224 and the suction side 226 in a pitch wise direction of the blade profile, and a major axis M2 that starts from a point at the leading edge 210 and ends at a point on the respective mean camber line 228a-228d (FIG. 4) at the trailing edge 222 to give M1:M2 a predefined or predetermined elliptical ratio. The ratio of the minor axis to the major axis defines the elliptical ratio of the partially swept leading edge surface 239, and in this example, is 1:4. The elliptical ratio results in the partially swept leading edge surface 239 having an elliptical profile, which extends along the partially swept region 234. As shown, the partially swept leading edge surface 239 is smooth, and monotonically increases from about 70% span at the leading edge 210 and 0% of the mean camber line 228a to 100% span at the tip 230 and about 15% of the mean camber line 228d. Thus, the partially swept leading edge surface 239 is a cut of the impeller blade 208 along the respective mean camber line 228a-228d in the streamwise direction Ds that increases monotonically from about 70% span at the leading edge 210 to about 100% span at the tip 230.

With reference back to FIG. 3, the plurality of splitter blades 220 are each composed of a metal or metal alloy, and may be formed by casting, additive manufacturing (selective metal sintering, etc.), etc. The splitter blades 220 are generally integrally formed with the impeller hub 216; however, the impeller blades 208 may be discretely formed and coupled to the impeller hub 216. Generally, the impeller 202 has a plurality of the splitter blades 220, which are spaced apart in an annular array about a circumference of the impeller hub 216 and are positioned in-between adjacent ones of the impeller blades 208. Each of the splitter blades 220 includes a leading edge 250 and an opposite, downstream trailing edge 252. The leading edge 250 is downstream of the impeller inlet 212 and downstream of the leading edge 210 of the impeller blades 208. The trailing edge 252 terminates at the vaneless gap 206 (FIG. 2).

With reference back to FIG. 2, the diffuser 204 is downstream from the impeller 202, and is spaced apart from the impeller 202 by the vaneless gap 206. The diffuser 204 has an inlet 270 in fluid communication with the impeller outlet 214, and an outlet 272 downstream from the inlet 270. In this example, the outlet 272 is in fluid communication with a deswirl section 274, which is in fluid communication with the combustion chamber 132; however, the outlet 272 of the diffuser 204 may be in fluid communication directly with the combustion chamber 132 (FIG. 1). Generally, the deswirl section 274 contains vanes, baffles, or the like, to reduce any tangential component of the airflow remaining from the action of the impeller 202. In this example, after the pressurized air exits the outlet 272, the pressurized air flows through the deswirl section 274 and enters the combustor section 116 to be received within the combustion chamber 132 (FIG. 1). The diffuser 204 includes a hub 276, a shroud 278 and at least one or a plurality of diffuser vanes 280. The diffuser 204 converts the kinetic energy imparted by the impeller 202 in the received fluid or air into a static pressure rise. In one example, the hub 276 circumscribes the impeller 202 when the diffuser 204 is installed in the gas turbine engine 100 (FIG. 1).

In one example, the impeller 202 is formed with the impeller blades 208 including the partially swept region 234 that defines the partially swept leading edge surface 239 and the splitter blades 220, with the impeller blades 208 and the splitter blades 220 positioned in the annular array about the impeller hub 216 such that a respective one of the splitter blades 220 is positioned between a pair of the impeller blades 208. The impeller hub 216 is coupled to the shaft, such as the HP shaft discussed with regard to FIG. 1. The impeller shroud 218 is coupled to the gas turbine engine 100 so as to be opposite the impeller hub 216 and spaced apart from the impeller blades 208 by the tip gap TG, TG1. The diffuser 204 is formed such that the diffuser vanes 280 are coupled between the hub 276 and the shroud 278. The diffuser 204 is coupled to the gas turbine engine 100 such that the impeller 202 is circumscribed by the diffuser 204 and the vaneless gap 206 is defined between the diffuser 204 and the impeller 202.

During operation of the gas turbine engine 100, the compressed air from the one or more axial compressors 102 (FIG. 1) flows into the impeller inlet 212. The impeller blades 208 of the impeller 202, which may be driven by the HP turbine stage 136 (FIG. 1), imparts kinetic energy into the compressed air. The air exits the impeller outlet 214 and flows into the diffuser 204. The diffuser vanes 280 convert the kinetic energy imparted by the impeller 202 into a static pressure rise. The partially swept leading edge surface 239 of each of the impeller blades 208 improves choke mass flow capacity by about 2% and improves the overall pressure ratio of the radial compressor 200 by about 0.1%. The partially swept leading edge surface 239 of each of the impeller blades 208 also improves an efficiency of the radial compressor 200 by about 0.5%, and improves a numerical stall margin of the radial compressor 200 by about 7%. The partially swept leading edge surface 239 also increases an effective inducer area or an area of the impeller inlet 212 while promoting streamline flow through the impeller 202. In addition, the partially swept leading edge surface 239 delays shock formation for the high pressure ratio impeller 202, which reduces flow separation due to improved streamline flow, and also reduces flow blockage upstream of the splitter blades 220 that are downstream of the leading edge 210 of the impeller blades 208. Generally, the pressure ratio for the impeller 202 is about 8:1 for the exemplary gas turbine engine 100.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An impeller associated with a compressor of a gas turbine engine, comprising:
   a plurality of impeller blades, each impeller blade of the plurality of impeller blades having a leading edge, a trailing edge opposite the leading edge in a streamwise direction, each impeller blade of the plurality of impeller blades extending in a spanwise direction from a hub at 0% span to a tip at 100% span, each impeller blade of the plurality of impeller blades having a plurality of mean camber lines that each extend from the leading edge to the trailing edge at a respective spanwise location, with the leading edge including a partially swept leading edge region defined between 70% span to 100% span that extends in the streamwise direction between 3% to 15% of the tip of the impeller blade, at 70% span a point at the leading edge in the partially swept leading edge region is at 0% of a mean camber line in the streamwise direction, and at 80% span a second point at the leading edge in the partially swept leading edge region is between 1% to 7% with respect to the mean camber line at 70% span in the streamwise direction.

2. The impeller of claim 1, further comprising a plurality of splitter blades and a hub, the plurality of impeller blades coupled to the hub such that a respective one of the plurality of splitter blades is positioned between adjacent ones of the plurality of impeller blades so as to be downstream from the leading edge of the adjacent ones of the plurality of impeller blades.

3. The impeller of claim 1, wherein a blade height of each impeller blade of the plurality of impeller blades is reduced in the spanwise direction along the partially swept leading edge region compared to a remainder of the impeller blade downstream from the partially swept leading edge region.

4. The impeller of claim 3, wherein the blade height increases monotonically in the spanwise direction and the streamwise direction along the partially swept leading edge region from 70% span at the leading edge to the tip.

5. The impeller of claim 3, wherein each impeller blade of the plurality of impeller blades has a first blade height in the spanwise direction at the leading edge that is different than a second blade height and a third blade height each downstream of the leading edge.

6. The impeller of claim 1, wherein at 90% of the span a third point at the leading edge in the partially swept leading edge region is between 7% to 12.5% with respect to the mean camber line at 70% span in the streamwise direction.

7. The impeller of claim 6, wherein at 100% of the span a fourth point at the leading edge in the partially swept leading edge region is between 12.5% to 15% with respect to the mean camber line at 70% span in the streamwise direction.

8. The impeller of claim 1, wherein each impeller blade of the plurality of impeller blades has a pressure side opposite a suction side, and the partially swept leading edge surface is defined uniformly through both the pressure side and the suction side.

9. The impeller of claim 1, wherein the partially swept leading edge surface has an elliptical profile.

10. A radial compressor of a gas turbine engine, comprising:
    an impeller including a plurality of impeller blades and a plurality of splitter blades each coupled to an impeller hub, each impeller blade of the plurality of impeller blades having a leading edge, a trailing edge opposite the leading edge in a streamwise direction, each impeller blade of the plurality of impeller blades extending in a spanwise direction from a hub at 0% span to a tip at 100% span, with the leading edge including a partially swept leading edge region defined at 70% span at the leading edge that extends to the tip, at 70% span a point at the leading edge in the partially swept leading edge region is at 0% of a mean camber line in the streamwise direction, at 80% span a second point at the leading edge in the partially swept leading edge region is between 1% to 7% with respect to the mean camber line at 70% span in the streamwise direction, at 90% span a third point at the leading edge in the partially swept leading edge region is between 7% to 12.5% with respect to the mean camber line at 70% span in the streamwise direction, and at 100% span a fourth point at the leading edge in the partially swept leading edge region is between 12.5% to 15% with respect to the mean camber line at 70% span in the streamwise direction, each splitter blade of the plurality of splitter blades positioned between an adjacent pair of the plurality of impeller blades downstream from the leading edge; and
    a diffuser downstream of the impeller.

11. The radial compressor of claim 10, wherein the partially swept leading edge region has an elliptical profile defined by a ratio of a minor axis to a major axis, each of the impeller blades has a pressure side opposite a suction side, and the minor axis defined between the pressure side and the suction side.

12. The radial compressor of claim 10, wherein a blade height of each impeller blade of the plurality of impeller blades is reduced in the spanwise direction along the partially swept leading edge region compared to a remainder of the impeller blade downstream from the partially swept leading edge region.

13. The radial compressor of claim 12, wherein the blade height increases monotonically in the spanwise direction and the streamwise direction along the partially swept leading edge region from 70% span at the leading edge to the tip.

14. The radial compressor of claim 12, wherein each impeller blade of the plurality of impeller blades has a first blade height in the spanwise direction at the leading edge that is different than a second blade height and a third blade height each downstream of the leading edge.

15. The radial compressor of claim 10, wherein each impeller blade of the plurality of impeller blades has a pressure side opposite a suction side, and the partially swept leading edge region is defined uniformly through both the pressure side and the suction side.

* * * * *